(12) United States Patent
Sato et al.

(10) Patent No.: US 10,732,717 B2
(45) Date of Patent: Aug. 4, 2020

(54) TACTILE SENSATION PRESENTING DEVICE

(71) Applicant: ALPS ALPINE CO., LTD., Tokyo (JP)

(72) Inventors: Kunio Sato, Miyagi (JP); Daisuke Takai, Miyagi (JP); Yuzuru Kawana, Miyagi (JP); Katsunari Sato, Nara (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/420,635

(22) Filed: May 23, 2019

(65) Prior Publication Data

US 2019/0278374 A1 Sep. 12, 2019

Related U.S. Application Data

(63) Continuation of application No. PCT/JP2017/041122, filed on Nov. 15, 2017.

(30) Foreign Application Priority Data

Nov. 28, 2016 (JP) .................. 2016-230451

(51) Int. Cl.
*G06F 3/01* (2006.01)
*G01K 13/04* (2006.01)
(52) U.S. Cl.
CPC ............. *G06F 3/016* (2013.01); *G01K 13/04* (2013.01); *G06F 3/01* (2013.01)
(58) Field of Classification Search
CPC ................. G06F 3/016; G01K 13/04

USPC ........................................ 340/407.1
See application file for complete search history.

(56) References Cited

U.S. PATENT DOCUMENTS

| | | | | |
|---|---|---|---|---|
| 5,155,625 A | * | 10/1992 | Komatsu | B60R 1/0602 219/219 |
| 2010/0156818 A1 | * | 6/2010 | Burrough | G06F 3/041 345/173 |
| 2016/0216766 A1 | * | 7/2016 | Puskarich | G06F 3/0416 |
| 2016/0216794 A1 | * | 7/2016 | Yoon | G06F 3/0416 |
| 2018/0091065 A1 | * | 3/2018 | Bae | H02N 1/04 |

FOREIGN PATENT DOCUMENTS

| | | |
|---|---|---|
| JP | H07-072018 | 3/1995 |
| JP | 2003-091233 | 3/2003 |
| JP | 2011-244921 | 12/2011 |

OTHER PUBLICATIONS

International Search Report dated Dec. 19, 2017 in PCT/JP2017/041122 filed on Nov. 15, 2017.

* cited by examiner

*Primary Examiner* — Fabricio R Murillo Garcia
(74) *Attorney, Agent, or Firm* — IPUSA, PLLC

(57) ABSTRACT

A tactile sensation presenting device includes a vibrating element configured to present vibration information, a heater configured to present heat information, and a first heat insulating member disposed between the vibrating element and the heater. The heater is provided above the vibrating element and is provided at a contacting region which can be touched by an operating body.

8 Claims, 3 Drawing Sheets ically to the stage, and the Peltier element is disposed on
TACTILE SENSATION PRESENTING DEVICE

CROSS-REFERENCE TO RELATED APPLICATIONS

This application is a continuation of International Application No. PCT/JP2017/041122 filed on Nov. 15, 2017 and designated the U.S., which claims priority to Japanese Patent Application No. 2016-230451 filed on Nov. 28, 2016. The contents of these applications are incorporated herein by reference in their entirety.

BACKGROUND OF THE INVENTION

1. Field of the Invention

The present invention relates to a tactile sensation presenting device presenting thermal information or vibration information when touched by an operating body such as a finger.

2. Description of the Related Art

Patent Document 1 describes a device in which a tactile sensation presenting device generating vibration by a voice coil, a piezoelectric element, or the like, a Peltier element presenting a thermal sensation, and a sensor for measuring a temperature of skin are disposed on a base. The tactile sensation presenting device and the sensor are directly disposed on the stage, and the Peltier element is disposed on the tactile sensation presenting device. According to this configuration, not only a vibration but also an effect of temperature can be provided when a tactile sensation is presented. Thus, a tactile sensation transmitting device having higher expressiveness can be realized.

However, in the device disclosed in Patent Document 1, because only the single Peltier element is mounted on the tactile sensation presenting device, only a single thermal sensation can be presented by the Peltier element when a tactile sensation is presented by a vibration of the tactile sensation presenting device. Thus, to express texture and thermal sensation of an actual object, and to express motion, deformation, or the like of the object when a force is applied to the object, the fineness of presenting a tactile sensation, richness of expressiveness, and accuracy are not sufficient. In addition, in order to present thermal information efficiently, multiple thermal information presenting devices are required. However, because a Peltier element is expensive, a form of a tactile sensation presenting device is less flexible.

RELATED-ART DOCUMENTS

Patent Document

[Patent Document 1] Japanese Laid-open Patent Publication No. 07-072018

SUMMARY OF THE INVENTION

In order to solve the above-described problem, a tactile sensation presenting device according to an aspect of the present invention includes a vibrating element configured to present vibration information, a heater configured to present heat information, and a first heat insulating member disposed between the vibrating element and the heater. The heater is provided above the vibrating element and is provided at a contacting region which can be touched by an operating body.

DETAILED DESCRIPTION OF THE PREFERRED EMBODIMENTS

Figure 1:
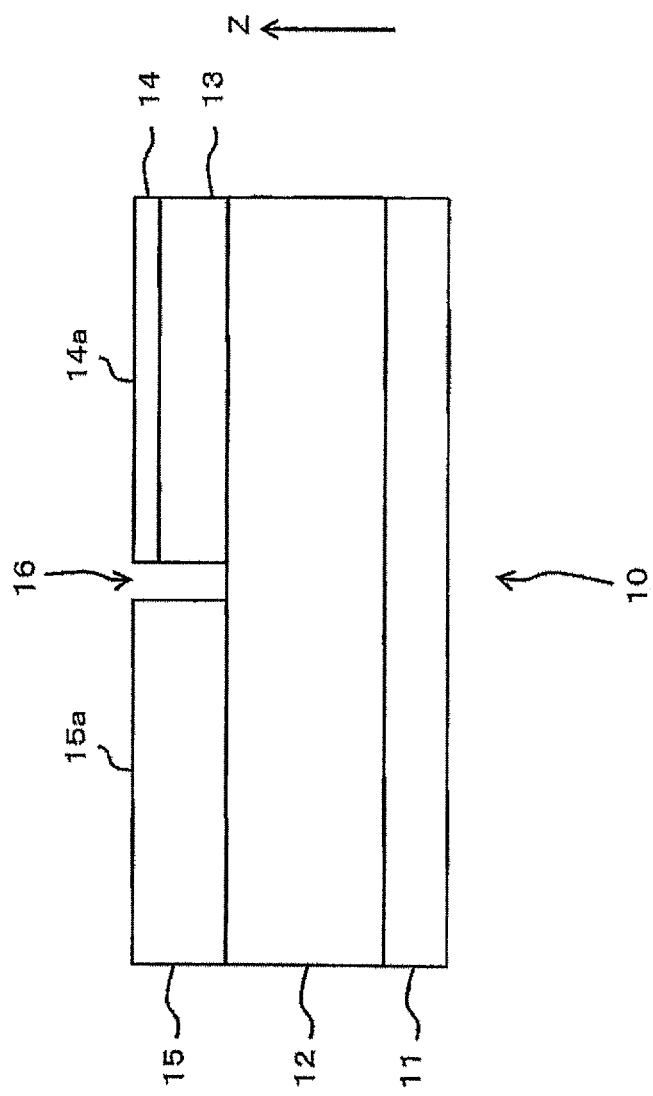
FIG. 1 is a diagram illustrating a schematic structure of a tactile sensation presenting device according to an embodiment of the present invention.
Figure 2:
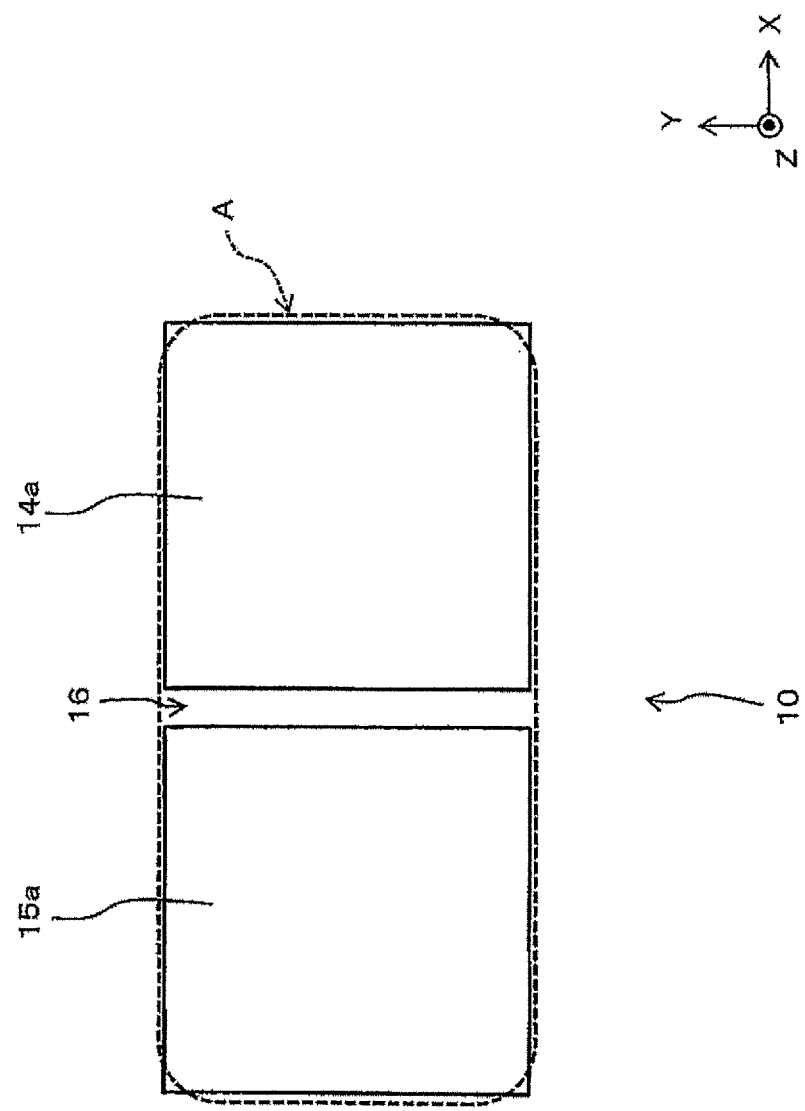
FIG. 2 is a plan view of the tactile sensation presenting device illustrated in FIG. 1.
Figure 3:
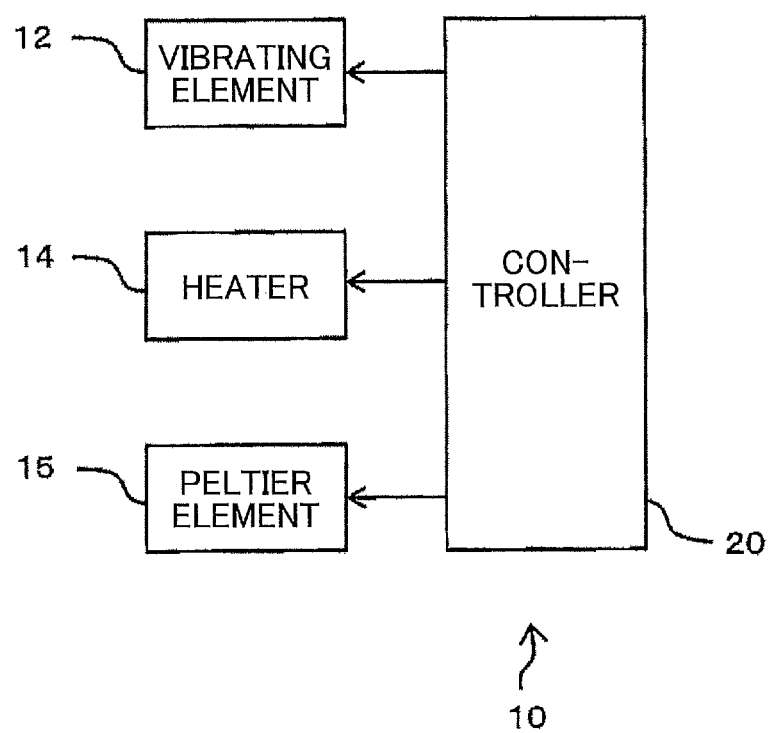
FIG. 3 is a functional block diagram of the tactile sensation presenting device according to the embodiment of the present invention.

In the following, a tactile sensation presenting device according to an embodiment of the present invention will be described with reference to the drawings. FIG. 1 is a diagram illustrating a schematic structure of the tactile sensation presenting device 10 according to the embodiment of the present invention, FIG. 2 is a plan view of the tactile sensation presenting device 10, and FIG. 3 is a functional block diagram of the tactile sensation presenting device 10.

As illustrated in FIG. 1, the tactile sensation presenting device 10 includes a base member 11 made from synthetic resin, a vibrating element 12 disposed on the base member 11, a heat insulating member 13, a Peltier element 15, and a heater 14. The heat insulating member 13 and the Peltier element 15 are disposed above the vibrating element 12, and the heater 14 is disposed above the heat insulating member 13. The base member 11 may be a push button provided at an operation device. A controller 20 outputs a control signal to each of the vibrating element 12, the heater 14, and the Peltier element 15.

The vibrating element 12 is structured, for example, such that a vibrator is supported by an elastic member such as a leaf spring in a metal case or cover so as to be able to vibrate freely. A coil is wound around the vibrator, and a magnet facing the coil is fixed in the case. When the controller 20 supplies, as the control signal, alternate current to the coil, the vibrator vibrates, and the vibrating element 12 can present predetermined vibration information. That is, the vibrating element 12 presents the predetermined vibration information by control of the controller 20. By varying the control signal supplied by the controller 20, strength of vibration, frequency of vibration, and the like, can be controlled.

The vibrating element 12 may be structured such that a vibrator is formed of a magnet and that a coil is fixed in the case so as to face the vibrator. Alternatively, the vibrating element 12 may be formed of a piezoelectric element, and the vibrating element 12 may be configured to vibrate in accordance with the control signal from the controller 20. In this case, it is preferable that a piezoelectric element of high thermal conductivity may be used as the vibrating element 12. Alternatively, it is preferable that a piezoelectric element used as the vibrating element 12 is provided in the metal case and that the heater 14 and the Peltier element 15 are arranged on an outer surface of the metal case.

The heater 14 includes an electric resistance unit configured to generate heat in accordance with electric current supplied as the control signal from the controller 20. Amount of heat generated by the electric resistance unit varies depending on magnitude, frequency, and the like, of the electric current supplied from the controller 20. The electric resistance unit is formed of a coil or a conductive pattern printed on the base member 11. By supplying electric current from the controller 20 to heat the heater 14, the heater 14 can present heat information causing a finger touching a surface 14a of the heater 14 to feel a warm temperature.

The heat insulating member 13 which is a first heat insulating member is provided between the vibrating element 12 and the heater 14, to prevent heat generated by the heater 14 from being transmitted to the metal case of the vibrating element 12. According to this structure, because heat generated by the heater 14 is less likely to be transmitted to the vibrating element 12, the heat is prevented from being absorbed by the vibrating element 12. Thus, the heater 14 can efficiently present a warm thermal sensation on the surface 14a of the heater 14.

The heat insulating member 13 is fixed on the surface of the metal case of the vibrating element 12 via an adhesive layer. The heat insulating member 13 is made of synthetic resin having low thermal conductivity. Alternatively, the heat insulating member 13 may be made of foamed resin or the like. The heat insulating member 13 may have a relatively high elastic modulus, to effectively transmit vibration information presented by the vibrating element 12 to the heater 14. Accordingly, the vibration information presented by the vibrating element 12 can be transmitted to the heater 14 with certainty. Similarly, the adhesive layer between the vibrating element 12 and the heat insulating member 13 may preferably have a characteristic of efficiently transmitting vibration information from the vibrating element 12 to the heat insulating member 13 (or to the heater 14 via the heat insulating member 13).

In a case in which the heater 14 is configured such that a heater unit is disposed on a heat insulating base member, the heat insulating member 13 can be omitted, and the heat insulating base member may be used as a member for preventing heat generated by the heater unit from transmitting to the vibrating element 12, by disposing the heater 14 on the vibrating element 12 such that a side of the heat insulating base member faces the surface of the metal case of the vibrating element 12. Also in this case, the heat insulating base member is fixed on the surface of the metal case of the vibrating element 12 via an adhesive layer.

The Peltier element 15 which is a warm and cold sensation presenting element utilizes heat transfer that occurs, for example, when DC current is supplied from the controller 20 to a junction of two metal plates facing each other in a Z-direction, and temperature on surfaces of the two metal plates varies in accordance with a direction and amount of the current. By controlling the direction and amount of the current supplied to the Peltier element 15, the Peltier element 15 can present warmth information that causes a finger touching the Peltier element 15 to feel warmth, and can present cold information that causes the finger to feel coldness. In the present embodiment, the warmth information and the cold information that the Peltier element 15 can present are collectively referred to as "warm and cold information".

By providing the Peltier element 15 in close contact with the metal case of the vibrating element 12, or by adhering the Peltier element 15 to the metal case via a thin adhesive layer or sheet, the metal case serves as a heat sink, heat can be transmitted between the Peltier element 15 and the metal case, and thermal saturation in the Peltier element 15 can be prevented. Accordingly, heat can be easily transmitted between the metal plate on a front side of the Peltier element 15 and the metal plate on a back side of the Peltier element 15, and responsiveness to temperature control of a surface 15a of the Peltier element 15 can improve.

Further, because the heat insulating member 13 which is the first heat insulating member is disposed between the metal case of the vibrating element 12 and the heater 14, heat generated by the heater 14 is less likely to be transmitted to the vibrating element 12. Thus, this structure can prevent the heat generated by the heater 14 from degrading responsiveness of temperature presentation of the Peltier element 15. Conversely, from perspective of the heater 14, because the heat insulating member 13 is provided, the heater 14 is less likely to be affected by the warm and cold information presented by the Peltier element 15.

As illustrated in FIG. 1, a gap 16 which is a second heat insulating member is provided between the Peltier element 15 and a set of the heater 14 and the heat insulating member 13. In other words, the Peltier element 15 and the set of the heater 14 and the heat insulating member 13 are placed on the vibrating element 12 such that the set of the heater 14 and the heat insulating member 13 is separated from the Peltier element 15 by the gap 16 which is a layer of air. According to the structure, the heater 14 and the Peltier element 15 can present the heat information and the warm and cold information respectively, without being affected by heat from each other. Thus, the heater 14 and the Peltier element 15 can respectively present the heat information and the warm and cold information as instructed, and a predetermined fine tactile sensation can be presented to a finger touching both of the heater 14 and the Peltier element 15.

Note that heat insulating material may be used for the gap 16, instead of the layer of air.

In a case in which the heater 14, serving as a heat stimulation unit to a supply heat stimulus to an operating body (such as hand or finger) touching the heater 14 in order to cause the operating body to feel warm temperature, and the Peltier element 15, serving as a cold stimulation unit to supply a cold stimulus in order to cause the operating body to feel cold temperature, are disposed alternately, even if a combination of temperature stimuli (such as a combination of 20° C. and 40° C.) is presented, a sense of pain occurs (Thermal Grill Illusion). For example, when a heat stimulus and a cold stimulus, which are each greater than a certain level such as 4° C./s or higher, are presented simultaneously from the above-described heat stimulation unit and cold stimulation unit, a sense of pain can be caused to occur.

A back surface of the Peltier element 15 is fixed to the metal case of the vibrating element 12 via an adhesive layer. Normally, a thickness of the Peltier element 15 in the Z-direction is 1 mm or greater, but a thickness of the heater 14 is approximately 0.1 to 0.2 mm because the heater 14 is formed of a base plate and a resistance layer. Thus, by setting the heat insulating member 13 to a thickness corresponding to a difference between the thickness of the Peltier element 15 and the thickness of the heater 14, the surface 15a of the Peltier element 15 and the surface 14a of the heater 14 can be aligned to be the same level, with respect to the vibrating element 12. The surface 14a of the heater 14 and the surface 15a of the Peltier element 15 form a contacting part that can be touched by a finger which is an operating body.

Different from the heater 14, a heat insulating member is not provided between the Peltier element 15 and the vibrating element 12. Further, the adhesive layer fixing the Peltier element 15 and the vibrating element 12 may preferably be thermal conductive material. According to this structure, because heat generated by the Peltier element 15 tends to be transmitted to the vibrating element 12, the heat can be transmitted via the metal case of the vibrating element 12.

Thus, efficiency of heat dissipation improves, and a rate of temperature change on the surface 15a of the Peltier element 15 can be increased. Further, the adhesive layer between the Peltier element 15 and the vibrating element 12 may preferably have a characteristic of efficiently transmitting vibration information from the vibrating element 12 to the Peltier element 15.

As illustrated in FIG. 3, the heater 14 and the Peltier element 15 are each connected to the controller 20, and temperature control of the heater 14 and temperature control of the Peltier element 15 are performed independently. For example, each of the heater 14 and the Peltier element 15 can present warm or cold information, such that a finger touching the heater 14 feels a warm temperature and that a finger touching the Peltier element 15 feels a cold temperature. In addition, both the heater 14 and the Peltier element 15 can cause fingers to feel warm temperatures, but the temperatures supplied by the heater 14 and the Peltier element 15 may be different.

Further, multiple heaters and multiple Peltier elements may be provided. For example, by arranging the multiple heaters and the multiple Peltier elements in a matrix form, and by performing temperature control of each of the heaters and Peltier elements, warm or cold information having a desired temperature gradient can be presented.

Further, it is preferable that a temperature sensor is provided on each of the surface 14a of the heater 14 and the surface 15a of the Peltier element 15, that a surface temperature is measured at each of the heater 14 and the Peltier element 15, and that a control signal to be supplied to each of the heater 14 and the Peltier element 15 is adjusted based on a difference between the measured temperature and a desired temperature.

A temperature of skin of a finger before touching the heater 14 or the Peltier element 15 (which may be referred to as an initial skin temperature or an acclimation temperature) affects sensitivity to warmth and coldness. In a case in which the Peltier element 15 is to present warmth, sensitivity of a finger with respect to warmth improves as the initial skin temperature of the finger is higher. In a case in which the Peltier element 15 is to present coldness, sensitivity of a finger with respect to coldness improves as the initial skin temperature of the finger is lower. In other words, as an initial skin temperature of a finger is higher, the finger senses a warm stimulus more easily, and as an initial skin temperature of a finger is lower, the finger senses a cold stimulus more easily. Thus, if a skin temperature of a finger is measured accurately by a temperature detecting element (not illustrated), and, based on the measured temperature, if the Peltier element is controlled to raise or lower a temperature, warm or cold stimuli can be clearly presented with small variation of temperature. For example, in a case in which the Peltier element is to present warmth when an initial skin temperature of a finger is 32° C., if a temperature of the Peltier element is set to a temperature higher than the skin temperature by 2° C. (that is, 34° C.), the Peltier element can cause the finger to feel "warm". However, in a case in which an initial skin temperature of the finger is 35° C., by setting a temperature of the Peltier element to 36° C. which is higher than the skin temperature by only 1° C., the Peltier element can cause the finger to feel "warm". Similarly, for example, in a case in which the Peltier element is to present coldness when an initial skin temperature of a finger is 32° C., if a temperature of the Peltier element is set to a temperature lower than the skin temperature by 1° C. (that is, 31° C.), the Peltier element can cause the finger to feel "cold". However, in a case in which an initial skin temperature of the finger is 29° C., by setting a temperature of the Peltier element to 28.5° C. which is lower than the skin temperature by only 0.5° C., the Peltier element can cause the finger to feel "cold".

As illustrated in FIG. 2, a shape of an outer periphery of a region, on which the heater 14 and the Peltier element 15 are provided, substantially coincides with a contacting region A which can be touched by an operating surface of a finger which is an operating body. Note that the operating surface of the finger is a pad of the finger, and that the contacting region A corresponds to an area of the pad which touches the heater 14 and the Peltier element 15. According to this structure, when a finger of an operating body touches the surface 14a of the heater 14, the finger also touches the surface 15a of the Peltier element 15.

With respect to an entire region on which the heater 14 and the Peltier element 15 are provided, it is preferable that an area and a shape of an outer periphery of the region are the same as those of the above-described contacting region A. However, as long as a finger can touch an area on which the heater 14 is provided and an area on which the Peltier element 15 is provided simultaneously, the contacting region A may be larger than the entire region on which the heater 14 and the Peltier element 15 are provided, or the entire region on which the heater 14 and the Peltier element 15 are provided may be larger than the contacting region A. However, the heater 14 and the Peltier element 15 may preferably be configured such that both an area of 50% or larger of the heater 14 and an area of 50% or larger of the Peltier element 15 can be touched by a finger.

Next, operations of the tactile sensation presenting device 10 and examples of tactile presentation will be described.

First, the controller 20 generates, as a tactile control signal, warm and cold control signals to cause the heater 14 and the Peltier element 15 to present warm or cold information, and a vibration control signal to cause the vibrating element 12 to present vibration information.

The warm and cold control signals are supplied to the heater 14 and the Peltier element 15 respectively. By supplying the warm and cold control signals, temperatures vary on the surface 14a of the heater 14 and on the surface 15a of the Peltier element 15, and a temperature that is sensed with a finger increases or decreases. Presentation of the heat information by the heater 14 and presentation of the warm and cold information by the Peltier element 15 are controlled independently from each other. Both of the presentations may be controlled simultaneously, but are not required to be controlled simultaneously. The structure in which the heat insulating member 13 is disposed between the heat conductive metal case of the vibrating element 12 and the heater 14 facilitates independent temperature settings of the surface 14a of the heater 14 and the surface 15a of the Peltier element 15.

For example, the tactile sensation presenting device 10 may cause a finger touching the surface 14a of the heater 14 to feel a warm temperature and may cause a finger touching the surface 15a of the Peltier element 15 to feel a cold temperature. Alternatively, the Peltier element 15 may present heat information on the surface 15a of the Peltier element 15. Because each of the heater 14 and the Peltier element 15 can present warm and cold information for supplying different temperatures, a thermal response rate can be improved as a whole, and a rate of presenting warm or cold information can be increased. In other words, by providing the heater 14 and the Peltier element 15, electric power efficiency improves and presenting speed can be increased as compared to a case in which a single Peltier element changes a state from a state presenting heat information to a state presenting cold information.

The vibration control signal is supplied to the vibrating element 12, and a vibration occurs on the vibrating element 12 in accordance with this vibration control signal. This vibration is transmitted to a finger via the heater 14 or the Peltier element 15. Presentation of the vibration information by the vibrating element 12 may be performed in parallel with presentation of the warm or cold information by the heater 14 and the Peltier element 15. However, the presentation of the vibration information by the vibrating element 12 is not required to be performed in parallel with the presentation of the warm or cold information.

Further, the controller 20 can be connected, via an interface (not illustrated), to an external application or an external measurement system. Even in a state in which the controller 20 is connected to the application or the measurement system, the warm or cold information presented by the heater 14 or the Peltier element 15, or the vibration information presented by the vibrating element 12, can be changed.

(Summary)

According to the present embodiment, the tactile sensation presenting device includes a vibrating element configured to present vibration information, a heater provided in a contacting region capable of being touched by an operating body, the heater being disposed above the vibrating element and being configured to present heat information, and a first heat insulating member disposed between the vibrating element and the heater. According to this structure, because the vibration information can be combined with the heat information presented by the heater, presentation of a finer tactile sensation can be realized.

The tactile sensation presenting device may preferably further include a warm and cold sensation presenting element disposed above the vibrating element, and a second heat insulating member disposed between the warm and cold sensation presenting element and the heater. The warm and cold sensation presenting element may be provided in the contacting region, and may be configured to present warm and cold information. According to this structure, because the warm and cold sensation presenting element and the heater can respectively present the warm and cold information and the heat information without being affected by heat from each other, a predetermined tactile sensation can be presented to the operating body touching both of the heater and the warm and cold sensation presenting element. Further, by providing the heater and the warm and cold sensation presenting element, electric power efficiency improves and presenting speed can be increased as compared to a case in which only one of the heater and the warm and cold sensation presenting element is provided.

In the tactile sensation presenting device, the first heat insulating member may preferably have a thickness corresponding to a difference between a thickness of the warm and cold sensation presenting element and a thickness of the heater. According to this structure, a surface of the warm and cold sensation presenting element and a surface of the heater can be aligned to be the same level, with respect to the vibrating element.

The tactile sensation presenting device may further include a controller configured to control the vibrating element, the heater, and the warm and cold sensation presenting element. The controller may preferably cause the tactile sensation presenting device to present a tactile sensation including the warm and cold information, the heat information, and the vibration information, at the contacting region. According to this structure, a compound and fine tactile sensation can be presented.

The tactile sensation presenting device may further include a warm and cold sensation presenting element disposed above the vibrating element. The warm and cold sensation presenting element may be provided in the contacting region, and may be configured to present warm and cold information. Further, it is preferable that a heat insulating member is not provided between the vibrating element and the warm and cold sensation presenting element. According to this structure, heat generated by the warm and cold sensation presenting element can be dissipated from the vibrating element, and presentation speed can be increased.

The controller of the tactile sensation presenting device may preferably be configured to cause the heater and the warm and cold sensation presenting element to present the heat information and cold information respectively at the contacting region. According to the structure described here, a thermal response rate is increased, and a rate of presenting warm and cold information can be increased.

The tactile sensation presenting device may further include a conductive member between the heater and the vibrating element and between the warm and cold sensation presenting element and the vibrating element, and the conductive member may preferably include a thermal conductive material transmitting, to the vibrating element, heat generated when the warm and cold sensation presenting element presents the warm and cold information, and include a vibration conducting material transmitting the vibration information presented by the vibrating element to the heater and the warm and cold sensation presenting element. According to this structure, the vibration information presented by the vibrating element can be transmitted to the heater and the warm and cold sensation presenting element efficiently, and efficiency of heat dissipation improves because heat generated by the warm and cold sensation presenting element is efficiently transmitted.

In the tactile sensation presenting device, the conductive member may preferably have adhesiveness, and the conductive member may join the heater and the warm and cold sensation presenting element to the vibrating element. According to this structure, the vibration information presented by the vibrating element can be transmitted to the warm and cold sensation presenting element and the heater with certainty, and heat generated by the warm and cold sensation presenting element and the heater can be efficiently dissipated.

In the tactile sensation presenting device, the vibrating element may preferably include a metal cover, and the conductive member may join the metal cover to the heater and the warm and cold sensation presenting element. According to this structure, heat generated by the warm and cold sensation presenting element and the heater can be more efficiently dissipated.

As described above, the tactile sensation presenting device according to the present invention is useful in that the tactile sensation presenting device can realize presentation of finer tactile sensation.

Although the present invention has been described with reference to the above-described embodiments, the present invention is not limited to the above-described embodiments. Various enhancements or changes can be made within the scope of the present invention.

What is claimed is:

1. A tactile sensation presenting device comprising:
a vibrating element, disposed over a base member made from synthetic resin, configured to present vibration information;
a heater provided in a contacting region, of the tactile sensation presenting device, capable of being touched by an operating body, the heater being disposed above the vibrating element and being configured to present heat information;
a first heat insulating member disposed between a first section of the vibrating element and the heater, the heater disposed fitting the first heat insulating member;
a warm and cold sensation presenting element disposed above at a second section of the vibrating element, the warm and cold sensation presenting element being provided in the contacting region, and being configured to present warm and cold information; and
a second heat insulating member disposed on the vibrating element, between the warm and cold sensation presenting element and the heater.

2. The tactile sensation presenting device according to claim 1, wherein the first heat insulating member has a thickness corresponding to a difference between a thickness of the warm and cold sensation presenting element and a thickness of the heater.

3. The tactile sensation presenting device according to claim 1, further comprising a controller configured to cause the tactile sensation presenting device to present a tactile sensation including the warm and cold information, the heat information, and the vibration information at the contacting region, by controlling the vibrating element, the heater, and the warm and cold sensation presenting element.

4. The tactile sensation presenting device according to claim 1,
wherein the warm and cold sensation presenting element is in close contact with the vibrating element.

5. The tactile sensation presenting device according to claim 3, wherein the controller is configured to cause the heater and the warm and cold sensation presenting element to present the heat information and cold information respectively at the contacting region.

6. The tactile sensation presenting device according to claim 1, further comprising a conductive member between the heater and the vibrating element and between the warm and cold sensation presenting element and the vibrating element, wherein
the conductive member includes a thermal conductive material transmitting, to the vibrating element, heat generated when the warm and cold sensation presenting element presents the warm and cold information, and
a vibration conducting material transmitting the vibration information presented by the vibrating element to the heater and the warm and cold sensation presenting element.

7. The tactile sensation presenting device according to claim 6, wherein the conductive member has adhesiveness, and joins the heater and the warm and cold sensation presenting element to the vibrating element.

8. The tactile sensation presenting device according to claim 6, wherein the vibrating element includes a metal cover, and the conductive member joins the metal cover to the heater and the warm and cold sensation presenting element.

* * * * *